(12) United States Patent
Khadri et al.

(10) Patent No.: US 7,580,517 B2
(45) Date of Patent: Aug. 25, 2009

(54) METHODS AND SYSTEMS FOR PROVIDING DUPLICATE POINT CODE SUPPORT IN A SIGNALING MESSAGE ROUTING NODE

(75) Inventors: Seetharaman Khadri, Durham, NC (US); Peter Joseph Marsico, Chapel Hill, NC (US); Randal Latta Dunn, Jr., Cary, NC (US); Thomas Matthew McCann, Morrisville, NC (US); Mark Edward Kanode, Apex, NC (US)

(73) Assignee: Tekelec, Morrisville, NC (US)

( * ) Notice: Subject to any disclaimer, the term of this patent is extended or adjusted under 35 U.S.C. 154(b) by 1422 days.

(21) Appl. No.: 10/093,862

(22) Filed: Mar. 8, 2002

(65) Prior Publication Data

US 2002/0196779 A1 Dec. 26, 2002

Related U.S. Application Data

(60) Provisional application No. 60/295,955, filed on Jun. 5, 2001.

(51) Int. Cl.
*H04M 7/00* (2006.01)
(52) U.S. Cl. .................. 379/229; 379/221.01; 379/219
(58) Field of Classification Search ................ 379/229, 379/221.01, 219
See application file for complete search history.

(56) References Cited

U.S. PATENT DOCUMENTS

| | | | |
|---|---|---|---|
| 5,008,929 A | 4/1991 | Olsen et al. | |
| 5,712,908 A | 1/1998 | Brinkman et al. | |
| 5,812,639 A | 9/1998 | Bartholomew et al. | |
| 5,838,782 A * | 11/1998 | Lindquist ................. | 379/221.1 |
| 5,852,660 A | 12/1998 | Lindquist et al. | |
| 5,862,129 A | 1/1999 | Bell et al. | |
| 5,930,700 A | 7/1999 | Pepper et al. | |
| 5,983,217 A | 11/1999 | Khosravi-Sichani et al. | |
| 6,070,076 A | 5/2000 | Valentine | |

(Continued)

FOREIGN PATENT DOCUMENTS

WO    WO 00/11883    3/2000

OTHER PUBLICATIONS

Supplementary European Search Report for European Application No. 02737387.7-1249 (Oct. 24, 2007).

(Continued)

*Primary Examiner*—Rasha S Al Aubaidi
(74) *Attorney, Agent, or Firm*—Jenkins, Wilson, Taylor & Hunt, P.A.

(57) ABSTRACT

A duplicate point code routing node is capable of routing messages to nodes having the same point code but being located in different national networks. The duplicate point code routing node associates a group code with received messages and uses the group code to route the messages to the appropriate national network. The group code may be determined based on the link or linkset from which a message is received or from the message itself.

37 Claims, 9 Drawing Sheets

U.S. PATENT DOCUMENTS

| | | | |
|---|---|---|---|
| 6,144,654 A * | 11/2000 | Ibanez-Meier et al. | 370/342 |
| 6,175,574 B1 | 1/2001 | Lewis | |
| 6,324,183 B1 | 11/2001 | Miller et al. | |
| 6,327,270 B1 | 12/2001 | Christie et al. | |
| 6,330,324 B1 | 12/2001 | Sabinson et al. | |
| 6,363,431 B1 | 3/2002 | Hammer et al. | |
| 6,515,985 B2 * | 2/2003 | Shmulevich et al. | 370/356 |
| 6,987,781 B1 * | 1/2006 | Miller et al. | 370/496 |

OTHER PUBLICATIONS

Anonymous, "SS7 Telephony Technical Specifications," Trillium Digital Systems, Inc., www.trillium.com/products/ss7-telephony/techical, p. 1, (2001).

Anonymous, "Message Transfer Part (MTP) Level 3," Trillium Digital Systems, Inc., www.trillium.com/tech/1078028.html, p. 1-3, (2001).

* cited by examiner

METHODS AND SYSTEMS FOR PROVIDING DUPLICATE POINT CODE SUPPORT IN A SIGNALING MESSAGE ROUTING NODE

RELATED APPLICATIONS

This application claims the benefit of U.S. provisional patent application No. 60/295,955, filed Jun. 5, 2001, the disclosure of which is incorporated herein by reference in its entirety.

TECHNICAL FIELD

The present invention relates to routing messages between telecommunications networks. More particularly, the present invention relates to methods and systems for routing messages between telecommunications networks in which some signaling nodes share point code values.

BACKGROUND ART

A conventional telecommunications network includes two distinct communication pathways or subnetworks—a voice network and a signaling network. These two networks function in a cooperative manner to facilitate calls between users. As implied by its name, the voice network handles the transmission of voice (or user data) information between users. The signaling network has a number of responsibilities, which include call setup, call teardown, and database access features. In simple terms, the signaling network facilitates the dynamic linking together of a number of discrete voice-type communication circuits such that a voice-type connection is established between a calling and a called party. Additionally, the signaling network provides a framework through which non-voice-related information may be transported, with this data and transport functionality being transparent to the users. This signaling technique is often referred to as out-of-band signaling, where the term "band" implies voice band.

The signaling protocol most commonly employed in communication networks around the world is the signaling system 7 (SS7) protocol. From a hardware perspective, an SS7 network includes a plurality of SS7 nodes, generically referred to as signaling points (SPs) that are interconnected using signaling links, also referred to as SS7 links. At least three types of SPs are provided in an SS7 network: service switching points (SSPs), signal transfer points (STPs) and service control points (SCPs). Within an SS7 signaling network, each SP is assigned an SS7 network address, which is referred to as a point code (PC).

An SSP is normally installed in Class 4 tandem or Class 5 end offices. The SSP is capable of handling both in-band signaling and SS7 signaling. An SSP can be a customer switch, an end-office, an access tandem and/or a tandem. An STP transfers signaling messages from one signaling link to another. STPs are packet switches and are generally installed as mated pairs. Finally, SCPs control access to databases, such as 800 number translation databases, 800 number carrier identification databases, calling card verification databases, etc.

Signaling links are transmission facilities used to connect SPs. Conventional signaling links are dedicated bidirectional facilities operating at 56 kbps in the U.S. and Canada and at 64 kbps when clear channel capability is deployed. Normally, every link has a mate for redundancy and enhanced network integrity.

Although the SS7 protocol was devised to ensure consistent and reliable communication across a signaling network infrastructure, it has proven to be the case that most countries have chosen to implement slightly different versions of the protocol. For instance, in the United States, an American National Standards Institute (ANSI) version of the SS7 protocol is employed. In Europe an International Telecommunications Union (ITU) version of the SS7 protocol is employed. In Europe, different countries may utilize different versions of ITU SS7. Such protocol variations pose significant problems for network operators attempting to provide international connectivity.

The goal of international connectivity is further complicated by the fact that telecommunications networks in different countries use the same point codes. That is, although a given SS7 point code must be unique within a given country's signaling network, there is no prohibition on using the same point code in another country's signaling network. This duplicate point code usage problem is particularly prevalent in the European telecommunications market.

In an effort to circumvent the duplicate point code usage problem, the ITU introduced a dual addressing scheme. This dual addressing scheme essentially defines two SS7-based protocols for use within a signaling network, a national (ITU-N) protocol and an international (ITU-I) protocol. Simply put, ITU-N point codes are 14-bit values that must be unique within a particular national signaling network but may be simultaneously assigned to SS7 nodes residing in other national networks. ITU-I point codes are also 14-bit values that must be universally unique. That is, no two SS7 nodes connected to an ITU international network may have the same ITU-I point codes.

FIG. 1 is a network diagram illustrating an example of the ITU-I and ITU-N point code scheme. The example illustrated in FIG. 1 includes a French ITU-based SS7 signaling network 100 and an Italian ITU-based SS7 signaling network 102. French network 100 includes a signal transfer point 104, a signaling point 106, and a signaling point 108. Similarly, Italian network 102 includes a signal transfer point 110, a signaling point 112, and a signaling point 114.

The French and Italian signaling points may be connected to their respective STPs via SS7 signaling links. The French and Italian STPs are connected via an SS7 signaling link. As such, all signaling between these two national networks takes place via the two STPs. That is, a French signaling point cannot directly signal an Italian signaling point. Instead, a French signaling point must formulate a signaling message that is transmitted to French STP 104 and subsequently routed to Italian STP 110, which transmits the message to the intended Italian signaling point. It will be appreciated that the French and Italian STPs serve to effectively isolate their respective networks from each other. From an ITU-N (national) message routing standpoint, French STP 104 is only provisioned with rules for routing messages within the French national network. The French STP has no knowledge and no need for knowledge of Italian national routing rules. This is the case because the ITU-I (international) protocol standard requires that any French signaling point intending to communicate with an Italian signaling point must generate and transmit an ITU-I signaling message addressed to the ITU-I point code of the intended Italian signaling point. In such an inter-network communication scenario, an ITU-N signaling message addressed to an ITU-N point code cannot be directly routed between two national networks. Rather, messages transmitted between networks must use ITU-I point codes.

As further indicated by the example illustrated in FIG. 1, each signaling point in the French and Italian networks is assigned both an ITU-N point code and an ITU-I point code.

That is, French node 106 is assigned an ITU-N point code of 247 and an ITU-I point code of 5-0-1. Italian node 112 is assigned an ITU-N point code of 247 and an ITU-I point code of 5-0-3. Given the existing ITU dual protocol addressing scheme it would be difficult for an international network operator to implement a single STP (or mated STP pair) to simultaneously serve multiple national networks. That is, a single STP tasked with simultaneously routing ITU-N (national) traffic associated with two (or more) national networks would likely encounter signaling messages from one national network that are addressed to a point code that is also being used in the other national network. This would be the case for messages destined to either French signaling point 106 (French ITU-N point code: 247) or Italian signaling point 112 (Italian ITU-N point code: 247). Such duplicate point code routing scenarios present significant problems for STP routing nodes and their operators. Again, the problem is that a single STP directly coupled to SPs with duplicate point codes in two different national networks would have significant difficulty determining to which national network a message should be routed. In addition to message routing difficulties, network management in such a duplicate point code scenario would be extremely difficult.

While the separate gateway STP approach illustrated in FIG. 1 is functional, it is at the same time inefficient with regard to STP resource requirements. That is, a network operator that provides service in a number of countries is not able to consolidate STP processing for the different countries into a single STP node. Instead, the operator in each country must install and maintain a separate STP to allow for the routing of country specific ITU-N signaling traffic without the duplicate point code conflicts described above. Each STP must also use ITU-I point codes to route messages between national networks.

While other solutions to this duplicate point code dilemma have been proposed and implemented, they each have significant problems. For instance, one solution involves incorporating a system identifier (SID) within a signaling message to distinguish between messages with the same point codes destined for different signaling points in different national networks. However, it has been proven that SID codes can also present numbering conflicts between countries. Wireless systems use five-digit SID codes to uniquely identify each operator's network and market, and these SID code ranges are allocated internationally by the International Forum on AMPS Standards Technology (IFAST) and in North America by CIBERNET. In keeping with the SID concept, national network operators are supposed to use codes designated by their national telecommunications authority within the range specified for their country. However, as international coordination of SID assignments is relatively recent, some SIDs are in use by operators in more than one country. Consequently, a network operator with a large base of embedded non-IFAST SIDs must either find a solution to potential SID conflict issues or re-program mobile handsets. In other words, the SID solution has simply created another network identifier that has no guarantee of uniqueness, which presents the same core problem as duplicate national point codes.

Therefore, what is needed is a system and method of enabling a single STP or STP-like routing node to simultaneously route signaling messages between multiple national networks that employ duplicate point codes.

DISCLOSURE OF THE INVENTION

The present invention includes a communications network element that is capable of providing intra- and inter-network message routing functionality in a networking environment including multiple national signaling networks. More particularly, a routing node of the present invention routes signaling messages between multiple national networks, where the same point code is used in two or more of the networks. The present invention may be implemented as a signal transfer point that facilitates signaling communication within and between different national signaling system 7 networks with signaling points that share point codes. In order to achieve this duplicate point code routing functionality, in one example, the present invention assigns a group code to a received message based on the linkset and adjacent point code from which the message was received. Once the group code is assigned, it may be used to internally route the message to the output port associated with the appropriate destination group, which may be a national network. By providing such duplicate point code support, a single STP of the present invention provides the intra- and inter-network routing functionality that previously required multiple conventional STPs.

According to another aspect, a duplicate point code routing node may insert group codes in a newly-defined field in outgoing IP-encapsulated SS7 messages. This group code field may be used by destination IP/SS7 nodes to route messages to the proper national network.

The functions for providing duplicate point code routing support are described herein as modules, applications, or processes. It is understood that these modules, applications, or processes may be implemented as computer-executable instructions embodied in a computer-readable medium. Alternatively, the modules, applications, or processes described herein may be implemented entirely in hardware. In yet another alternative, the modules, applications, or processes described herein may be implemented as a combination of hardware and software.

The modules, applications, or processes for providing duplicate point code routing functionality are described below as being associated with cards or subsystems within an STP or signaling gateway routing node. It is understood that these cards or subsystems include hardware for storing and executing the processes and modules. For example, each card or subsystem described below may include one or more microprocessors, such as an x86 microprocessor available from Intel Corporation or a K series microprocessor available from AMD corporation and associated memory.

Accordingly, it is an object of the present invention to provide a routing node that routes signaling messages within multiple national networks where the same point code is used in two or more of the national networks.

It is another object of the present invention to provide a routing node that facilitates signaling communication within and between two different signaling networks with signaling points having duplicate point codes.

It is another object of the present invention to provide a routing node that routes International Telecommunications Union National signaling protocol signaling messages within multiple national networks.

It is another object of the present invention to provide a system and method for routing signaling messages within and between signaling networks in a multinational signaling network environment, wherein a received signaling message is assigned a group code identifier that associates the message with one of the national signaling networks.

It is yet another object of the present invention to provide a system and method for generating accounting and billing information associated with the routing of signaling messages within and between signaling networks in a multinational signaling network environment, wherein a received signaling message is assigned a group code identifier that is used or included in the accounting and billing information.

It is yet another object of the present invention to provide a system and method for routing a signaling message based on the national network from which the message originated.

It is yet another object of the present invention to provide a system and method for isolating network management messages to the proper group using group codes.

Some of the objects of the invention having been stated hereinabove, other objects will become evident as the description proceeds, when taken in connection with the accompanying drawings as best described hereinbelow.

DETAILED DESCRIPTION OF THE INVENTION

Figure 2:
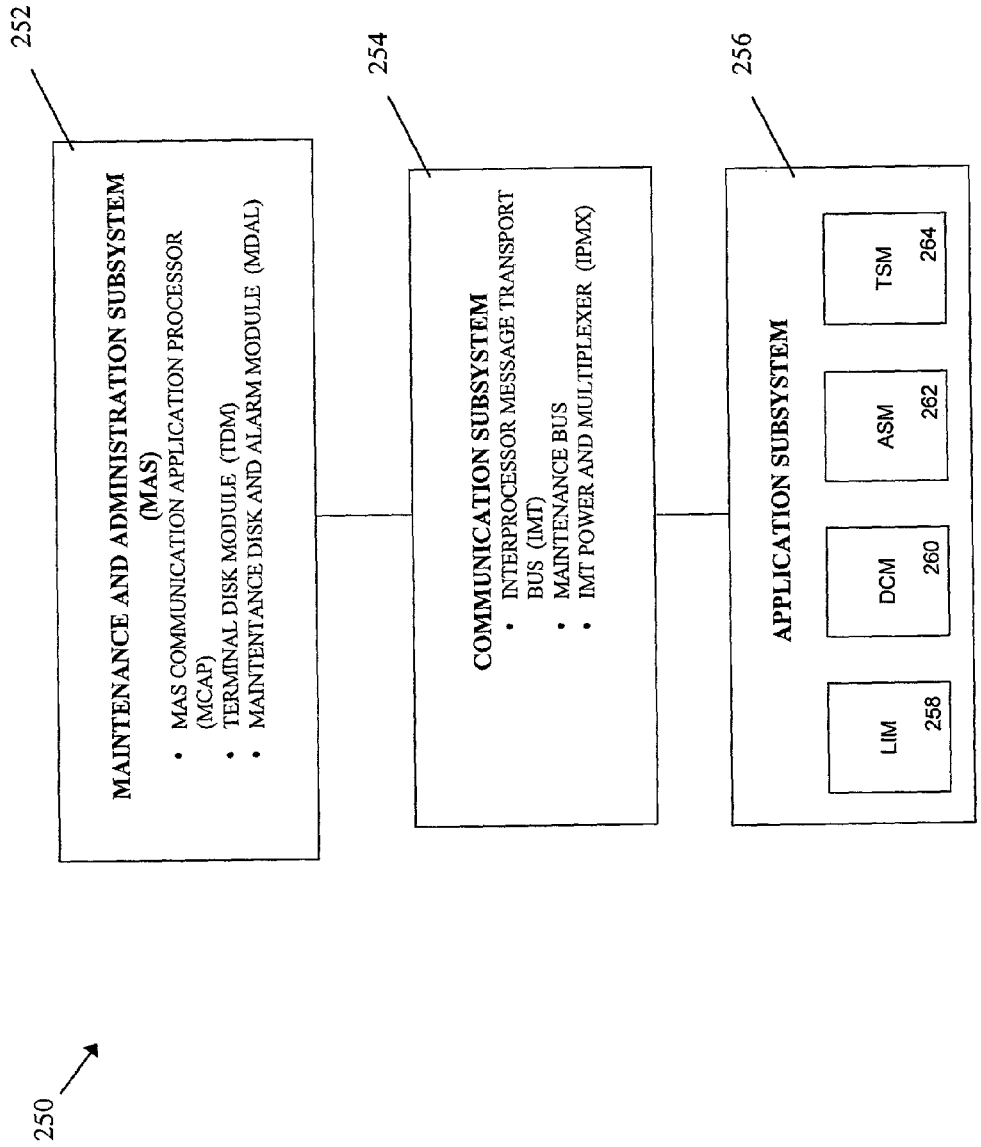
FIG. 2 is a block diagram of a signaling gateway routing node architecture suitable for use with embodiments of the present invention.

Some of the embodiments of a duplicate point code routing node described herein may include an underlying hardware platform similar to a signal transfer point or signaling gateway routing node. Exemplary hardware platforms suitable for use with embodiments of the present invention include the high performance STP and signaling gateway respectively marketed by Tekelec of Calabasas, Calif. as the EAGLE® STP and IP7™ Secure Gateway. FIG. 2 illustrates the internal systems of a gateway architecture suitable for use with embodiments of the present invention. In FIG. 2, gateway 250 includes the following subsystems: a maintenance and administration subsystem (MAS) 252, a communication subsystem 254, and an application subsystem 256. MAS 252 provides maintenance communications, initial program load, peripheral services, alarm processing and system disks. Communication subsystem 254 includes an interprocessor message transport (IMT) bus that is the main communication bus among all subsystems gateway 250. This high-speed communications system includes two 125 Mbps counter-rotating serial rings.

Application subsystem 256 includes application cards that are capable of communicating with the other cards through the IMT bus. Numerous types of application cards can be incorporated into SG 250, including: a link interface module (LIM) 258 that interfaces with SS7 links and X.25 links, a data communications module (DCM) 260 that provides an Internet Protocol interface using transmission control protocol or other suitable transport layer protocol, and an application service module (ASM) 262 that provides global title translation, gateway screening and other services. A translation service module (TSM) 264 may also be provided to support triggered local number portability service.

Duplicate Point Code Routing Node Architecture

Figure 3:
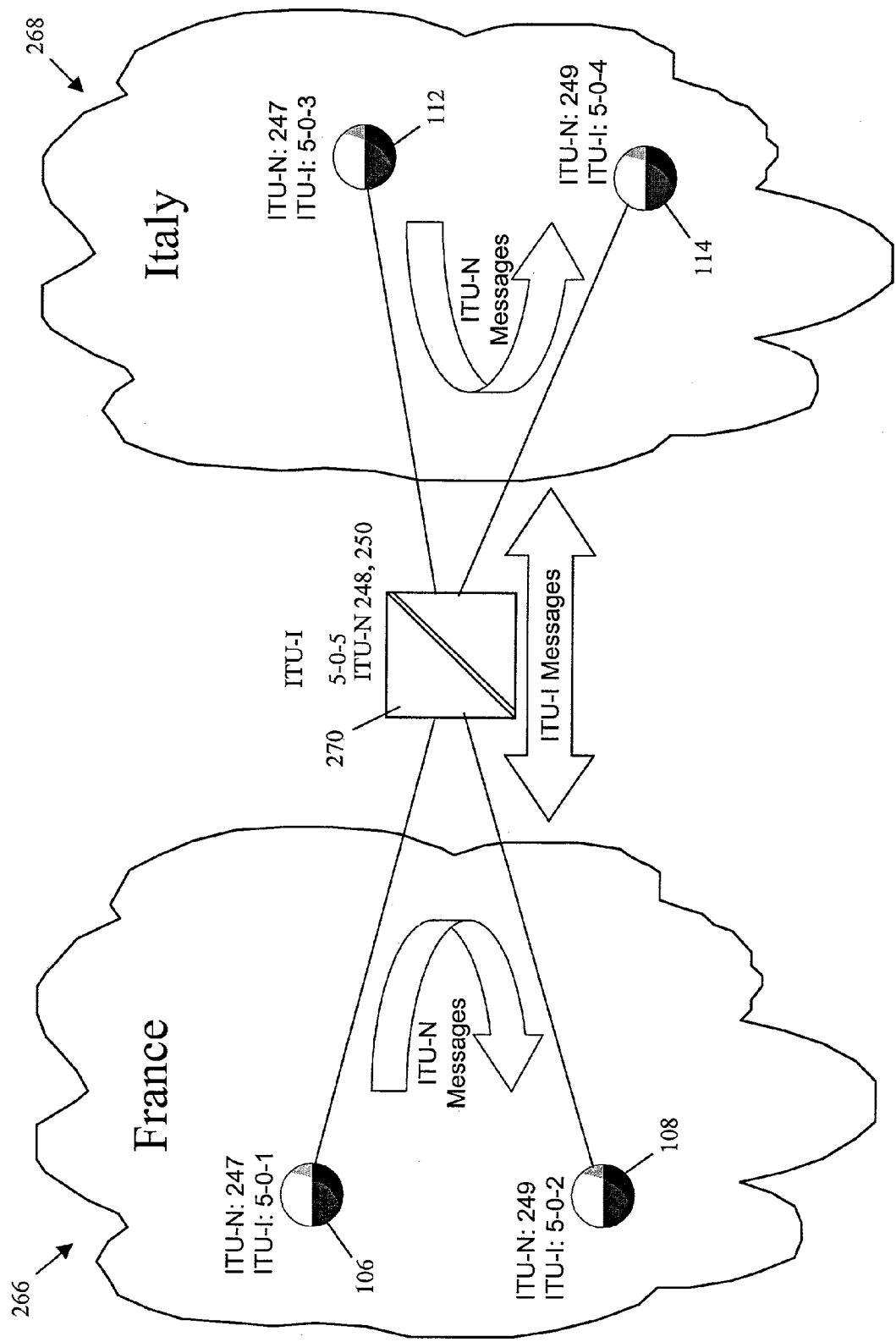
FIG. 3 is a network diagram illustrating national network message flows associated with a duplicate point code routing node according to an embodiment of the present invention.

FIG. 3 illustrates a network including a duplicate point code routing node 270 according to an embodiment of the present invention. In the example network shown in FIG. 3, duplicate point code routing node 270 is coupled to a French national signaling system 7 network 266 as well as to an Italian national SS7 network 268. French network 266 includes a pair of signaling points 106 and 108, where SP 106 is assigned an ITU national point code of 247 as well as an ITU international point code of 5-0-1. SP 108 is assigned an ITU national point code of 249 as well as an ITU international point code of 5-0-2. Duplicate point code routing node 270 may include an ITU-I point code of 5-0-5 and multiple ITU-N point codes corresponding to STPs 104 and 110 replaced by duplicate point code routing node 270. Using a single routing node to replace multiple STPs is described in commonly-assigned, co-pending U.S. patent application Ser. No. 09/969,173, filed Sep. 18, 2001, the disclosure of which is incorporated herein by reference in its entirety. Again, it will be appreciated that an ITU national point code is relevant or valid only within the national network in which it is assigned. An ITU international point code address is valid outside of national network boundaries and is generally considered valid in the international network in which it is defined. In a similar manner, Italian network 268 includes a pair of signaling points 112 and 114, where SP 112 is assigned an ITU-N point code of 247 and an ITU-I point code of 5-0-3. Italian SP 114 is assigned an ITU-N point code address of 249 and an ITU-I point code of 5-0-4.

French SP 108 and Italian SP node 114 share the same ITU-N point code (i.e., PC=249). Despite the duplicate point code assignment within the adjoining national networks, duplicate point code routing node 270 routes French-generated ITU-N messages addressed to a point code of 249 to French SP node 108 and routes Italian-generated ITU-N messages addressed to a point code of 249 to Italian SP 114. The functionality for correctly performing duplicate point code routing will be described in detail below. DPC routing node 270 also routes ITU-I messages between the French and Italian networks 266 and 268 respectively.

Figure 4:
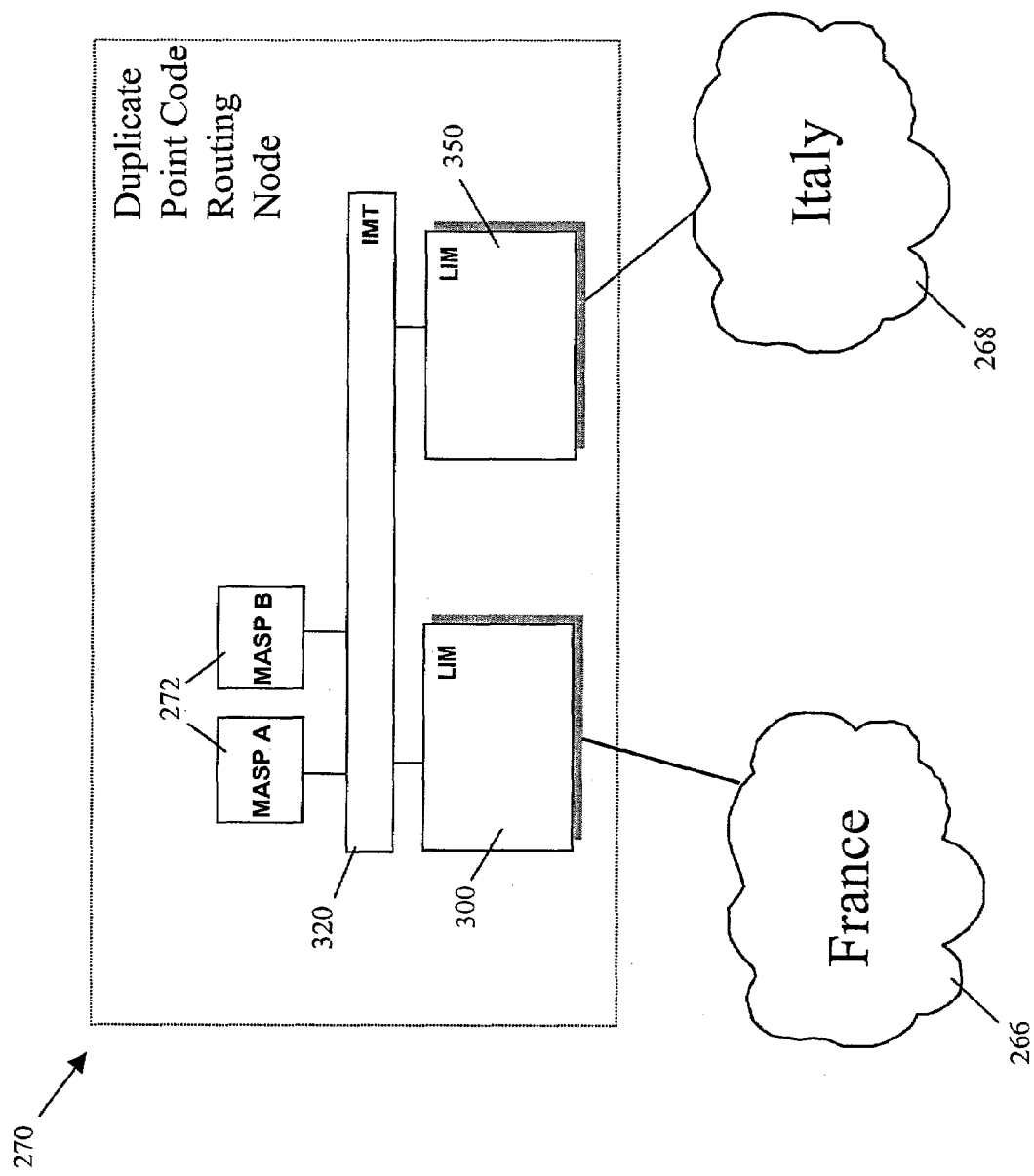
FIG. 4 is a block diagram of a duplicate point code routing node according to an embodiment of the present invention.

FIG. 4 illustrates an exemplary internal architecture of a duplicate point code routing node according to an embodiment of the present invention. In FIG. 4, duplicate point code routing node 270 includes a high-speed interprocessor message transport communications bus 320. A number of distributed processing modules or cards are coupled to IMT bus 320, including: a pair of maintenance and administration subsystem processors (MASPs) 272, a first SS7-capable link Interface module 300, and a second SS7-capable link Interface module 350. These modules are physically connected to IMT bus 320 such that signaling and other type messages may be routed internally between active cards or modules. For simplicity of illustration, only a single pair of LIM processors 300 and 350 are shown in FIG. 4. However, the present invention is not limited to only two LIMs. Multiple LIMs and other modules may be connected to IMT bus 320 without departing from the scope of the invention.

From a hardware perspective, LIMs 300 and 350 may each comprise a printed circuit board physically connected to IMT bus 320. Each printed circuit board may include a communication processor programmed to send and receive messages via IMT bus 320. Each printed circuit board may also include an application processor programmed to perform various functions. For example, the application processor of LIM 350 may be programmed to perform the functions described herein for routing messages having between different national networks having duplicate point codes.

MASP pair 272 implement the maintenance and administration subsystem functions described above. Since MASP pair 272 are not particularly relevant to a discussion of the duplicate point code routing attributes of the present invention, a detailed discussion of their function is not provided herein.

SS7 Link Interface Module (LIM) Architecture

Figure 5:
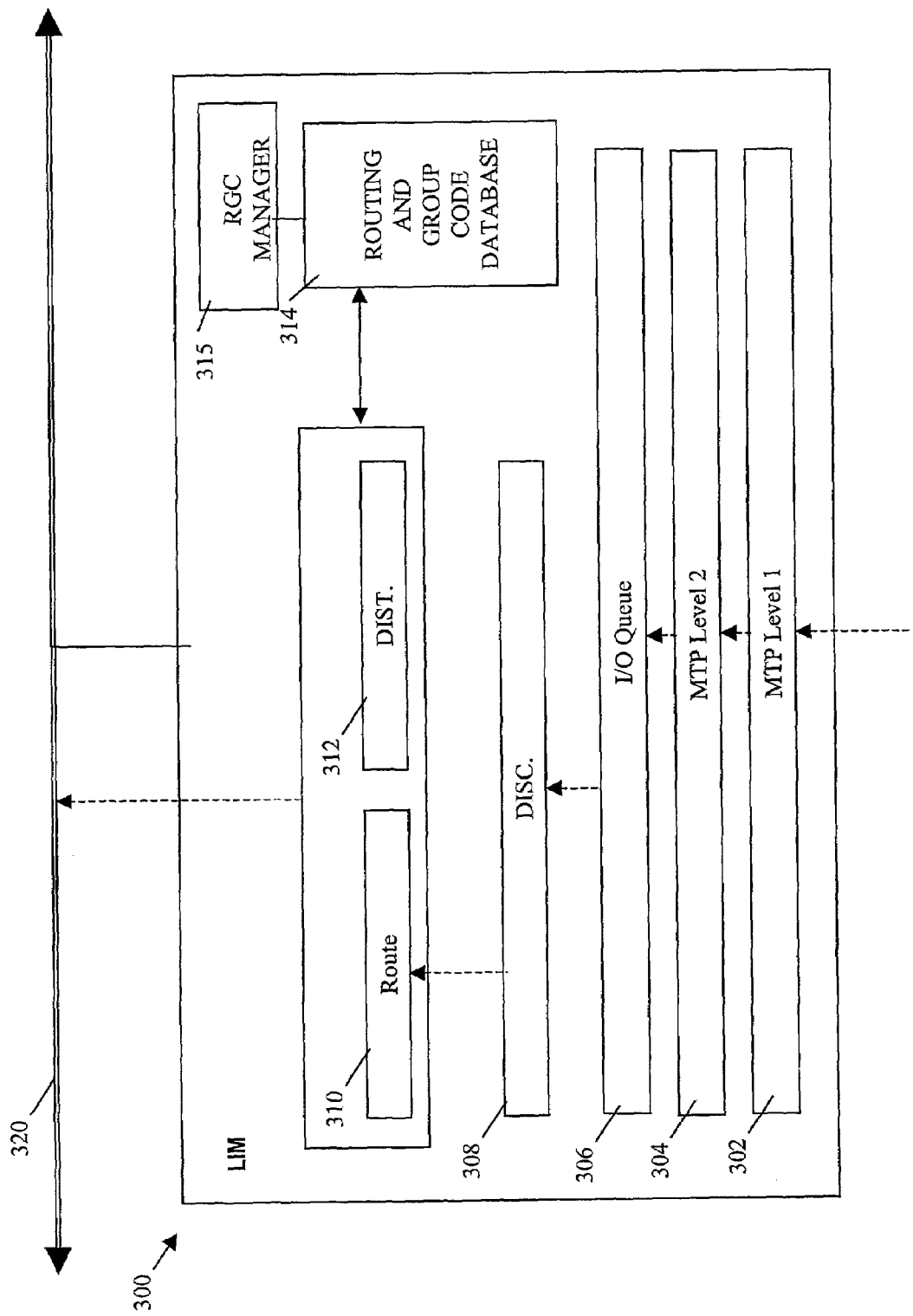
FIG. 5 is a block diagram of an SS7 link interface module (LIM) illustrating an exemplary message flow associated with the receipt of a signaling message according to an embodiment of the present invention.

Referring to FIG. 5 and focusing now on LIM card functionality, LIM 300 is comprised of a number of components including: an SS7 message transfer part (MTP) level 1 module 302, an SS7 message transfer part (MTP) level 2 module 304, an I/O buffer or queue 306, an SS7 MTP level 3 discrimination module 308, a routing module 310, and a distribution module 312. MTP level 1 module 302 sends and receives digital data over a particular physical medium, such as a DS0 communication link. Working in conjunction with the MTP level 1 module 302, MTP level 2 module 304 provides error detection, error correction, and sequenced delivery of SS7 message packets. I/O queue 306 provides for temporary buffering of incoming and outgoing SS7 signaling message packets. Discrimination module 308 receives signaling messages from the lower processing layers and performs a discrimination function, effectively determining whether an incoming SS7 message packet requires internal processing or is to be through-switched. Routing module 310 routes messages received from the discrimination module 308 that do not require further processing at the DPC routing node and are to be through-switched. Distribution module 312 internally distributes SS7 message packets received from discrimination module 308 that require additional processing by duplicate point code routing node 270 prior to final routing.

LIM 300 also stores routing data used for routing signaling messages. In FIG. 5, this routing data is stored in a routing and group code (RGC) database 314. In one embodiment, RGC database 314 includes a route table and a linkset table. The route and linkset tables may contain signaling route and signaling route status information, along with internal IMT bus routing information.

An RGC database manager 315 performs a number of functions including the administration of routing data within the route and linkset tables. RCG database manager 315 may also notify other communication modules of changes in the status of links and other nodes in the serviced SS7 network(s). In one embodiment of the present invention, RGC manager 315 may receive SS7 network management messages, use information contained within the network management messages to update route status information contained in the route and linkset tables, and subsequently distribute the network management information to other communication modules connected to IMT bus 320.

Table 1 shown below illustrates an exemplary data structure and data associated with the route table.

TABLE 1

Route Data

| KEY(s) | | | DATA FIELDS | | | | |
|---|---|---|---|---|---|---|---|
| ANSI | ITU-I | ITU-N | Route Cost | LinkSet Status | Adjacent Status | Overall Status | Linkset Name |
| — | 5-0-1 | 247-FR | 10 | A | A | A | LS1 |
| — | 5-0-1 | 247-FR | 20 | P | A | P | LS2 |
| — | 5-0-3 | 247-IT | 30 | A | A | A | LS3 |
| — | 5-0-3 | 247-IT | 10 | A | P | P | LS4 |
| — | 5-0-2 | 249-FR | 20 | A | A | A | LS5 |
| — | 5-0-2 | 249-FR | 30 | A | A | A | LS6 |
| 6-7-1 | — | — | 10 | A | A | A | LS7 |
| — | 7-0-1 | 201-FR | 10 | A | A | A | LS8 |
| — | 7-0-2 | 301-IT | 10 | A | A | A | LS8 |

As illustrated in Table 1, the route table includes a plurality of key fields, which may be used alone or in combination to index the table. More particularly, the route table includes an ANSI point code key field, an ITU-I point code key field, and an ITU-N point code key field. The route table also includes a route cost field, a linkset status field, an adjacent node status field, an overall status field, and a linkset identifier or pointer field.

It will be appreciated by those skilled in the art of SS7 communications that the ITU national and international signaling protocols may utilize a 14-bit point code, while the ANSI signaling protocol employs a 24-bit point code. According to an important aspect of the invention, the ITU-N point code field may store not only a 14-bit ITU-N point code, but also a 10-bit group code identifier. This group code identifier may be a two-character ASCII code used to identify a particular national network. For instance, in the sample data shown in Table 1, each ITU-N point code entry includes either an "FR" or an "IT" group code appended to the point code value, where "FR" indicates the French network, and "IT" indicates the Italian network. As such, two identical ITU-N point code values associated with two different networks may be simultaneously provisioned in the route table provided that these two ITU-N point code entries are assigned a different group code, that defines the network within which each point code is valid. In the examples described herein, group codes are used in conjunction with ITU-N signaling messages to achieve the duplicate point code routing functionality of the present invention. However, such group codes could also be employed in a similar manner with other signaling protocols (e.g., ANSI, ITU-I, etc.) to achieve this same duplicate point code routing capability.

Table 2 shown below illustrates an exemplary data structure and exemplary linkset data that may be associated with a linkset table according to an embodiment of the present invention.

TABLE 2

Linkset Data

| KEY(s) | | DATA FIELDS | | | |
|---|---|---|---|---|---|
| Linkset Name | Link | IMT/Card Address | Port | Link Status | Adjacent Point Code and Group Code |
| LS1 | 0 | 1305 | A | A | 247-FR |
| LS1 | 1 | 1307 | B | U | 247-FR |
| LS2 | 1 | 1505 | B | A | 247-IT |

TABLE 2-continued

Linkset Data

| KEY(s) | | DATA FIELDS | | | |
|---|---|---|---|---|---|
| Linkset Name | Link | IMT/Card Address | Port | Link Status | Adjacent Point Code and Group Code |
| LS2 | 2 | 2300 | A | A | 247-IT |
| LS5 | 0 | 3301 | A | A | 249-FR |
| LS5 | 1 | 3313 | B | A | 249-FR |
| LS8 | 1 | 1105 | A | A | 201-FR |

Each entry in Table 2 includes a compound key including a linkset identifier and a signaling link field. Table 2 also includes an IMT address field and a communication port field. The IMT address and communication port fields may contain IMT bus address and communication port information associated with communication modules connected to IMT bus 320. More particularly, a record in Table 2 may include an IMT address and communication port value associated with a communication module that supports the specific link identified in the record key. For example, as shown in Table 2, link 0 of linkset 1 resides on a communication module that has an IMT bus address of 1305 and a communication port address of "A". Table 2 also includes a link status field that indicates that link 0 of linkset 1 is available for service.

Each entry in Table 2 may also include an adjacent point code (APC) field that contains information identifying the signaling node connected at the distant end of a signaling link. In one embodiment, the APC field includes ITU-N point code and the group code associated with each point code. Once again, a group code may be a two-character code that identifies a particular national network (e.g., FR, IT, etc.).

In operation, a first lookup in the route table may returns an index value or pointer used in a second lookup in the linkset table. The ultimate result of this two-stage lookup procedure is an IMT bus address and communication port associated with a signaling link on a communication module. The data structures and data illustrated in Tables 1 and 2 are intended to illustrate exemplary data structures and data. However, the present invention is not limited to these data structures or data. For example, complex data structures, such as tree structures may be used to reduce lookup time. In yet another alternative, Tables 1 and 2 may be combined, such that only a single lookup is required.

Duplicate Point Code Routing Using Group Codes

Figure 6:
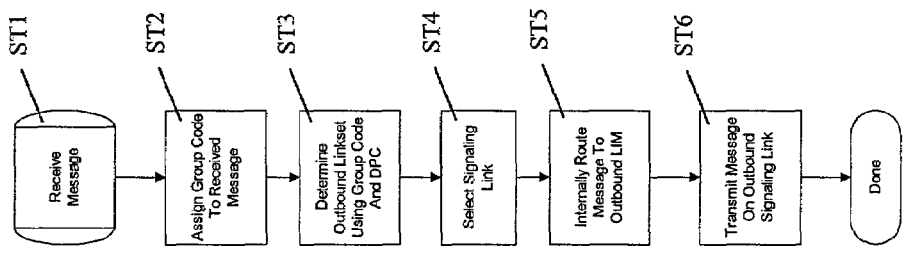
FIG. 6 is a flow chart illustrating exemplary signaling message processing associated with LIM 300 illustrated in FIG. 5.

FIG. 6 is a flow chart illustrating exemplary steps for duplicate point code routing using group codes according to an embodiment of the present invention. For purposes of illustration, it is assumed that the signaling message being processed is an SS7 message. However, a duplicate point code routing node according to the present invention may be used in a non-SS7 or hybrid SS7 environment for signaling messages that utilize non or hybrid SS7 signaling protocols (e.g., SIP or H.323 over IP, or SS7 over IP using TALI or M3UA/SCTP). In any event, the block diagram presented in FIG. 5 may be used in conjunction with the Tables 1 and 2 and FIG. 6 to better understand duplicate point code routing using group codes according to an embodiment of the present invention. In this example, it is assumed that an SS7 signaling message is received at duplicate point code routing node 270 on linkset 1 from French signaling node 106 and that the signaling message is addressed to an ITU-N point code of 249, which is duplicated in the French and Italian networks. Since the message originates from SP 106 in French network 108, the intended destination is French SP 108 having the ITU-N point code 249, rather than Italian SP 114, also having the ITU-N point code 209. Duplicate point code routing node 270 determines the correct destination by associating group codes with the signaling linkset or adjacent point code from which a message is received, as will be described in detail below.

Beginning at inbound LIM 300, the SS7 signaling message is received (ST1) and SS7 MTP Level 1 and 2 processing is performed on the incoming signaling message by MTP Level 1 and 2 modules 302 and 304, respectively. MTP level 1 module 302 performs physical layer functions for the particular physical medium over which data is received. MTP level 2 module 304 performs error detection, error correction, and ensures sequenced delivery of SS7 message packets. With MTP Level 1 and 2 processing complete, the signaling message packet is temporarily buffered in I/O queue 306 before being passed up the stack to discrimination module 308. Discrimination module 308 examines the signaling message packet and determines whether the packet requires processing by duplicate point code routing node 270.

According to an important aspect of the invention, discrimination module 308 associates a group code value (e.g., "FR", "IT", etc.) with the received signaling message (ST2). In one embodiment, discrimination module 308 may store or maintain group code mapping information. Alternatively, discrimination module 308 may access the linkset table to determine the appropriate group code on a per received message basis. In this example, it is assumed that the discrimination module accesses the linkset table in order to determine the appropriate group code that is to be associated with a received signaling message. Referring to Table 2, a lookup is performed using the linkset from which the message was received. The adjacent point code associated with linkset 1 (LS1) is associated with a group code of "FR" and, as such, a group code value of "FR" is returned to discrimination module 308. Discrimination module 308 then passes the signaling message and the associated "FR" group code to routing module 310 for further routing processing. For received SS7 messages destined for an SS7 network node, the group code may only be used internally within routing node 270 to route the message to the link interface module associated with the destination SS7 network. For incoming SS7 messages destined for an IP network, the group code may be determined and stored in a predetermined field of the IP message. An exemplary structure for such a message will be discussed in detail below.

Figure 1:
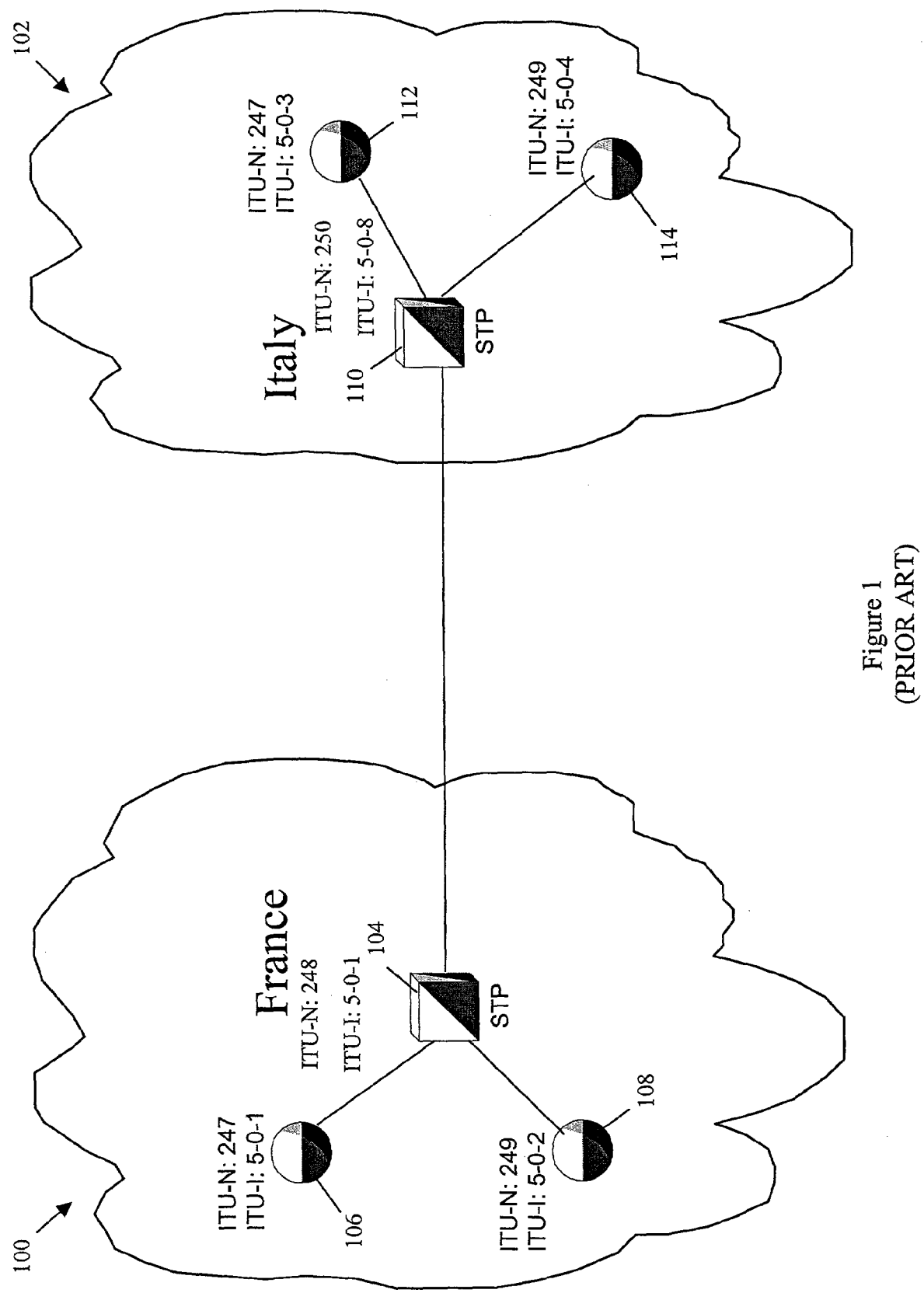
FIG. 1 is a network diagram illustrating two national signaling networks having duplicate point codes.

Using the linkset and adjacent point code from which a message is received to determine the group code eliminates the need for reprogramming network nodes that communicate with duplicate point code routing node 270 to use group codes. As a result, the multiple national network STP architecture illustrated in FIG. 1 can be transparently replaced by a single international duplicate point code routing node, as illustrated in FIG. 3.

Once a group code has been assigned to the message, routing module 310 accesses routing and group code database 314 in order to determine how and where the message should be routed. More particularly, using the destination point code parameter contained in the received signaling message (i.e., ITU-N point code address=249) and the associated group code provided by discrimination module 308 (i.e., FR), routing module 310 accesses the routing data in Table 1 (ST3).

Using, in this particular example, the ITU-N point code index and the group code, it is determined that the lowest cost route to point code address—group code, 249-FR, involves linkset 5 (LS5). As such, a lookup is performed in the linkset table (Table 2) using the selected linkset, LS5 (ST4). Those skilled in the art of SS7 message routing will appreciate that variety of approaches are employed to select a particular SS7 signaling link within a signaling linkset. Link selection algorithms are not essential in describing duplicate point code routing according to embodiments of the present invention. Hence, a description thereof will not be provided herein.

Once a particular signaling link within the selected linkset has been chosen, the corresponding physical address of the associated LIM and communication port are extracted from the linkset table. In this example, the result of the lookup in the linkset table for LS5, link 1 is an IMT bus address of 3313, which may correspond to a LIM or DCM associated with the French signaling network. Using this information, the signaling message is routed internally (if necessary) to the appropriate SS7 LIM or other communication module (e.g., DCM) for transmission to or towards the destination node, as indicated in steps ST5 and ST6.

In this example, duplicate point code routing node automatically assigns a group code to a received signaling message based on the signaling link on which the message was received and uses the group code in combination with the destination point code to route the message. Because the group code is only used internally to the routing node, there is no chance of conflicts between network operators using duplicate group codes as with the above-described system identifiers. In this example, group codes have no significance outside of the routing node and may thus be either ignored or discarded by other nodes.

Using Group Codes with IP-Encapsulated SS7 Messages

Figure 7:
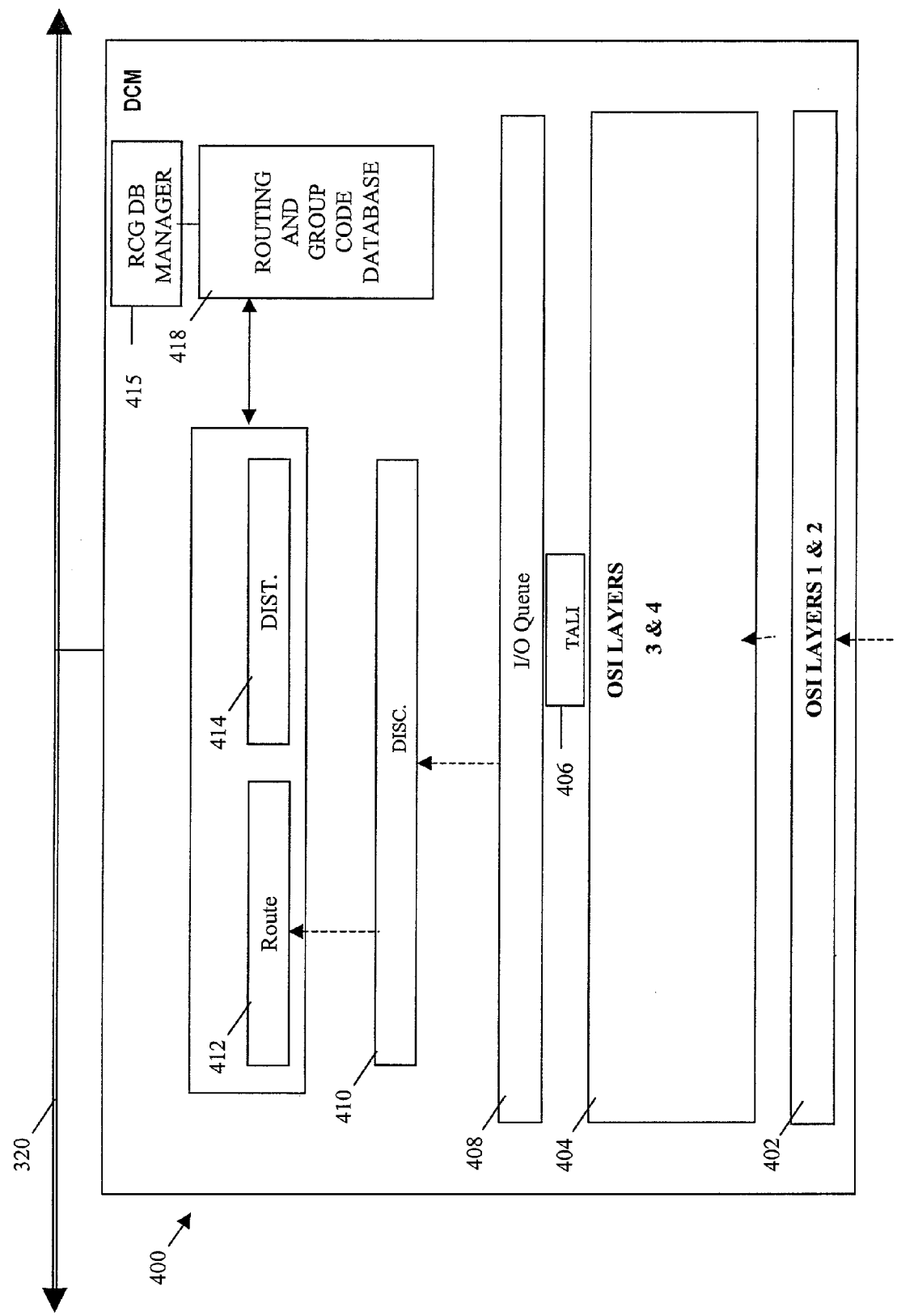
FIG. 7 is a block diagram of an Internet protocol (IP)-capable data communication module (DCM) according to an embodiment of the present invention.

As discussed above, a duplicate point code routing node according to the present invention is preferably capable of assigning an internal group code and using the internal group code to route received messages. In addition, a duplicate point code routing node is preferably also capable of routing received IP-based messages that include group codes and assigning group codes to outgoing IP messages. FIG. 7 illustrates a data communications module that includes duplicate point code routing functionality according to an embodiment of the present invention. In FIG. 7, data communications module 400 is connected to IMT bus 320. Data communications module 400 includes an OSI layers 1 and 2 module 402 for performing OSI physical and datalink layer functions. For example, OSI layers 1 and 2 module may include a PHY/framer chip that implements a physical layer, such as Ethernet, and a datalink layer, such as HDLC. OSI layers 3 and 4 module 404 may include software that implements a network layer, such as Internet protocol and a transport layer, such as transmission control protocol or user datagram protocol.

DCM 400 may include a transport adapter layer interface 406 to translate between SS7 and IP addressing schemes. An exemplary translation protocol that may be used is described in IETF RFC 3034: *Tekelec's Transport Adapter Layer Interface*, June 2000, the disclosure of which is incorporated herein by reference in its entirety. Alternatively, such translation may be performed using other protocols, such as the MTP layer 3 user adaptation layer (M3UA) as described in IETF Internet draft-sigtran-m3ua-12.txt, February 2002, the disclosure of which is incorporated herein by reference in its entirety. If TALI is used, the transport protocol implemented by OSI layers 3 and 4 module 404 is preferably TCP. If M3UA is used, the underlying transport protocol may be the stream control transmission protocol (SCTP).

I/O queue 408, discrimination module 410, routing module 412, distribution module 414, routing and group code database manager 415, and routing and group code database 418 provide functionality similar to their counterparts previously described with regard to the operation of LIM 300. That is, I/O queue 408 provides for temporary buffering of incoming and outgoing signaling message packets. Discrimination module 410 receives signaling message packets from the lower processing layers and performs a discrimination function, effectively determining whether an incoming message packet requires internal processing or is simply to be through-switched. Discrimination module 410 may also assign group codes to received messages. Routing module 412 routes messages received from discrimination module 410 that do not require further processing by DPC routing node 270 and are simply to be through-switched. Distribution module 414 distributes message packets received from the discrimination module 410 that require additional processing prior to final routing.

Figure 8:
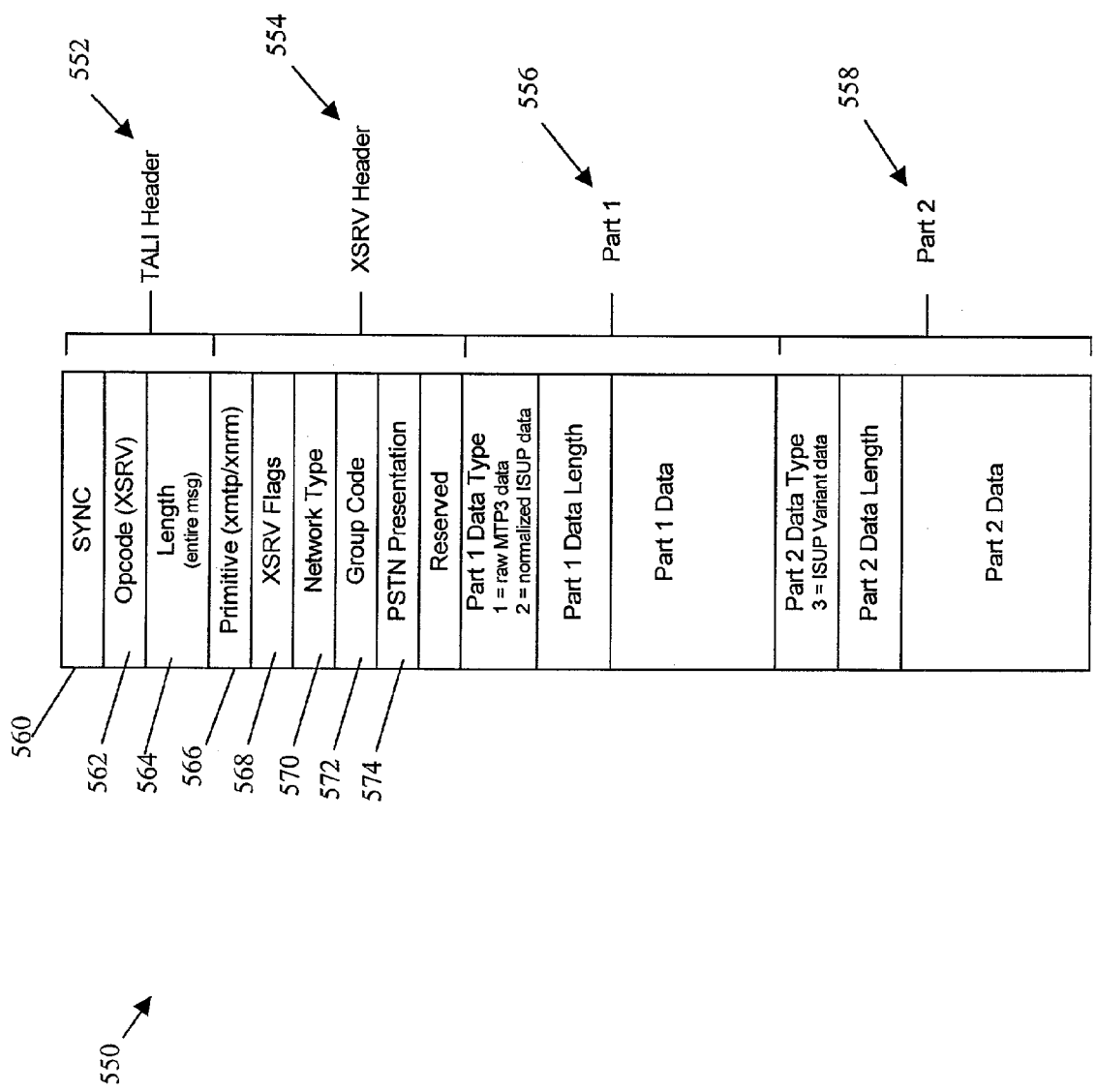
FIG. 8 is a diagram illustrating an exemplary transport adapter layer interface (TALI) packet structure suitable for communicating group codes among signaling points according to an embodiment of the present invention.

Although a number of different IP-based protocols (e.g., SS7 over IP using TALI or M3UA/SCTP, or non-SS7 protocols, such as SIP, MGCP or H.323) may be supported by a DCM module in a duplicate point code routing node of the present invention, the following example illustrates duplicate point code routing using the TALI protocol. FIG. 8 illustrates an exemplary TALI packet format including a group code field according to an embodiment of the present invention. In FIG. 8, a TALI packet 550 includes a TALI header 552, an extension service header 554, a part 1 data field 556, and a part 2 data field 558. TALI header 552 includes a SYNC field 560, an opcode field 562, and a length field 564. SYNC field 560 stores values that can be used as sequence numbers for reassembly of TALI data. Opcode field 562 stores a value indicating the type of payload carried by the data. Length field 564 stores the length of the TALI message.

Extended service header 554 includes a primitive field 566, extended service flags field 568, network type field 570, group code field 572, and PSTN presentation field 574. Extended service header 554 may also include a field that is reserved for future use. Primitive field 566 stores values that can be used in combination with the value stored in opcode field 562 to differentiate opcodes. Extended service flags field 568 stores flags associated with an extended service message. Network type field 570 stores the type of network to which the message is destined. According to an important aspect of the invention, group code field 572 stores group codes usable for duplicate point code routing according to an embodiment of the present invention. For example, a DCM may insert a group code in outbound TALI messages indicating the national network to which a message is destined. For example, if DCM 400 receives a message from another module in duplicate routing node 270 indicating the outbound linkset to which a message is destined, DCM 400 may perform a lookup a linkset table in routing and group code database 418 using the destination linkset to determine the group code to be associated with the message. The receiving TALI-capable node may utilize the group code to route messages to the appropriate national network when the national networks include duplicate point codes. The remaining fields in XSRV header are not important in explaining the present invention. Hence, a description thereof will not be included herein.

According to another aspect, group codes along with DCM 400 illustrated in FIG. 4 may be used to support multiple groups on a single physical interface. Conventional SS7 link interface modules are limited to one network connection per physical port located on the card. In contrast, using group codes, a DCM 400 may have a single physical layer interface that receives IP-encapsulated SS7 messages from multiple groups. The DCM may use the group code in the IP-encapsulated SS7 messages to determine to which group the messages should be routed. For outgoing messages, DCM 400 may encapsulate the group code within the IP message, as discussed above, and the recipient node may use the group code to determine where the message should be routed. For incoming messages that include group codes, DCM 400 may use the group code to identify the group of an incoming message received on the same physical interface. Accordingly, a DCM that uses group codes is capable of greatly expanding the link capabilities of a conventional signal transfer point or SS7/IP gateway.

In addition, using group codes, multiple groups may be supported on the same C link. Routing nodes, such as signal transfer points, are generally deployed as mated pairs. The routing tables on the mated pairs are preferably identical. If node A of a mated pair loses a route, node A needs to inform node B so that node B can update its routing table. One way to communicate information across multiple C links is to utilize multiple low-speed SS7 links between the mated pair. In such an embodiment, a routing node of the present invention may identify the proper C link based on the group code associated with a received network management message indicating that a route is down. In an alternate embodiment, multiple groups may be supported on a single IP C link, for example, provided by DCM 400 illustrated in FIG. 4. A routing node sending a route update message to its mate may encapsulate a group code within an IP packet to be sent over an IP-based C link. The packet includes the group code and the secondary adjacent point code of the mated routing node associated with the particular group. A secondary adjacent point, as used herein, is a point code that a duplicate point code routing node associates with a mated duplicate point code routing node and that the duplicate point code routing node recognizes as its true point code. For example, as described in the above-referenced commonly assigned, co-pending U.S. patent application Ser. No. 09/969,173. A routing node may associate multiple adjacent point codes with its mate. DCM 400 may include a table that associates its mate's secondary adjacent point codes with the proper group code. Accordingly, a DCM 400 according to the present invention may encapsulate a group code along with the proper secondary adjacent point code when forwarding routing update messages to its mate. As a result, a duplicate point code routing node of the present invention is capable of supporting multiple groups on a single IP C link.

Originating and Routing Network Management Messages Using Group Codes

In addition to using group codes to route SS7 signaling messages, a duplicate point code routing node of the present invention may utilize group codes to originate and isolate network management messages to the proper group or national network. For example, if LIM 350 described above receives a network management message, LIM 350 may perform a lookup in the linkset table (Table 2) to determine the proper group to which a network management message should be routed based on the linkset from which the message was received. If DCM 400 receives an IP-encapsulated SS7 network management message, DCM 400 may route the network management to the proper group based on the group code, in the event that the point code to which the network management message is addressed is shared by nodes in multiple networks. Similarly, when originating network management messages based on received network management messages, routing node 270 may use the group code associated with the received network management messages to determine the appropriate group to which the network management messages should be forwarded. Thus, in addition to routing signaling messages, a duplicate point code routing node of the present invention may associate with network management messages and use the group codes to isolate the network management messages to the proper network.

The inclusion of explicit group code information within a signaling packet is not limited to TALI-based messages. Such a duplicate point code routing scheme may be extended to include any of the above-referenced hybrid SS7 or non-SS7 protocols.

Group-Code-Based Billing

Figure 9:
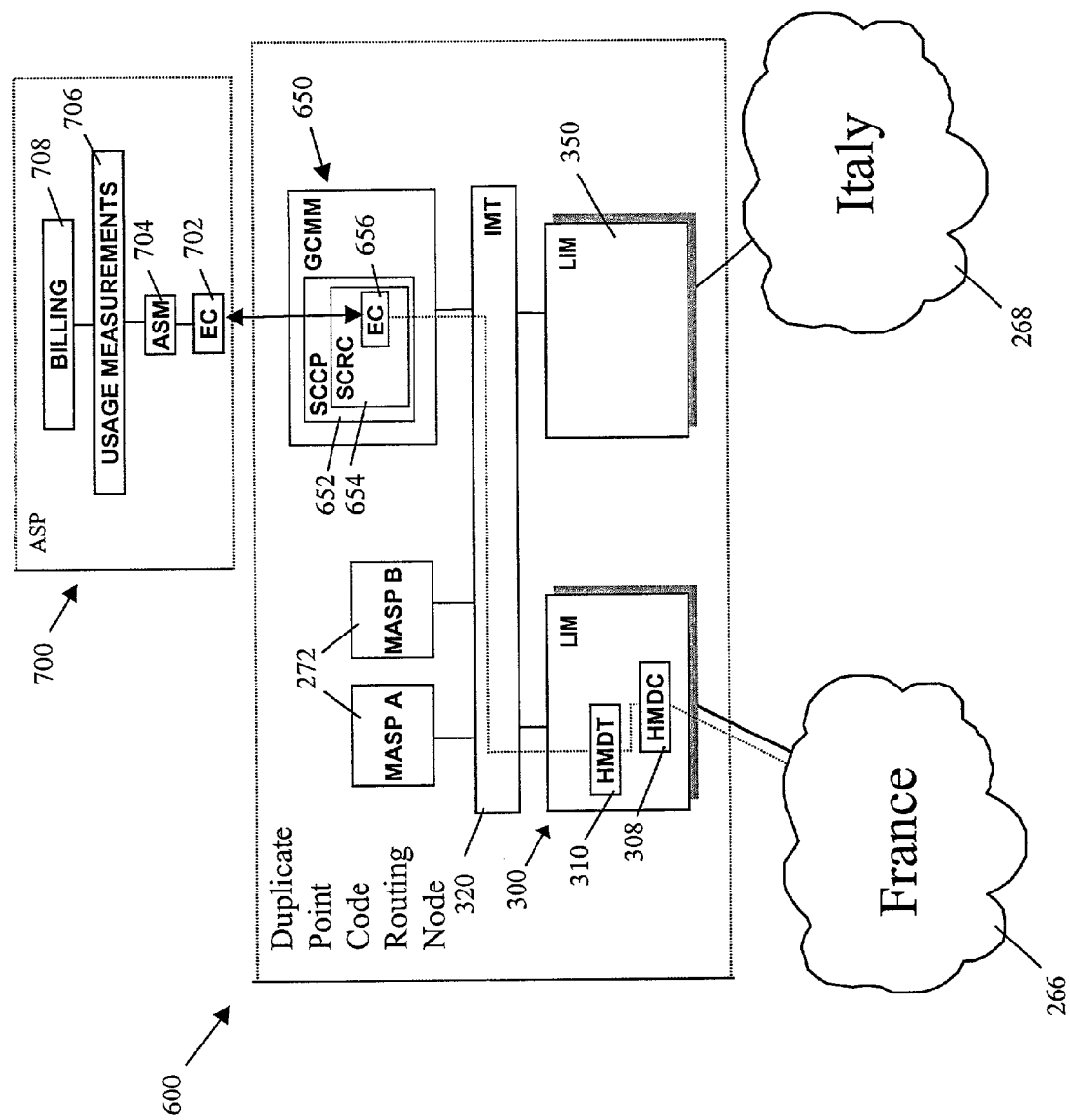
FIG. 9 is a schematic diagram of a duplicate point code routing node including a group code billing system according to an embodiment of the present invention.

An alternate embodiment of a duplicate point code routing node 600 is shown in FIG. 9. In FIG. 9, duplicate point code routing node 600 includes a pair of LIMs 300 and 350 and a message accounting and billing subsystem. In the particular embodiment shown, the message accounting subsystem include a group code measurements module (GCMM) 650 and an external accounting server platform (ASP) 700. From a practical implementation standpoint, ASP 700 may be a workstation, such as a NETRA™ workstation available from SUN Microsystems. The combination of GCMM card 650 and ASP accounting server 700 includes the database and control processes necessary to achieve the group-code-based accounting and billing functionality of the present invention. It will be further appreciated that the entire message accounting subsystem could also be located within a DPC routing node of the present invention, such that no external computing platform is required.

As discussed above, LIM 300 includes a discrimination application 308 that receives signaling messages from the lower processing layers (e.g., MTP levels 1 and 2) and performs a discrimination function to determine whether an incoming message packet requires internal processing or is simply to be through-switched. Discrimination module 308 may also access the RGC database (not shown in FIG. 9) in order to associate a group code with a received message. In a duplicate point code routing node that includes a billing system, discrimination module 308 may formulate an accounting message related to a received signaling message and forward this accounting message to discrimination module 310 for subsequent delivery to and processing by GCMM module 650, as generally indicated by the dashed line in FIG. 9.

The accounting message may simply be a copy of the original received signaling message, or the accounting message may be of a message type associated specifically with the accounting subsystem. In one embodiment, a copy of the received signaling message along with the group code may be encapsulated within a signaling connection control part (SCCP) wrapper and addressed to a group code billing subsystem located within the duplicate point code routing node. As such, the SCCP-encapsulated copy of the original received signaling message is passed to distribution module 310. Distribution module 310 is responsible for the internal distribution of messages that require processing by other subsystems in the duplicate point code routing node (e.g., accounting and billing, local number portability, calling name delivery, etc.). The original received signaling message may be processed and routed to the correct national network based on the group code, as described above.

GCMM 650 shown in FIG. 9 includes a signaling connection control part subsystem 652 that is responsible for receiving and preliminary processing of incoming SCCP-encapsulated accounting message packets. GCMM card 650 also includes an SCCP controller known as a signaling connection routing controller (SCRC) 654 and a high-speed Ethernet controller (EC) 656. Once again, as described above, SCCP subsystem 652 is responsible for receiving and preliminary processing of incoming SCCP-encapsulated message packets, while SCRC 654 is responsible for discrimination and subsequent distribution of messages based on information contained in an SCCP packet. In the case of GCMM card 650, messages that satisfy the SCRC discrimination criteria are distributed or directed to the high-speed Ethernet controller 656. EC 656 is in turn responsible for communicating messages, via an Ethernet connection, to and from ASP server 700. More particularly, ASP server 700 includes a corresponding high-speed Ethernet controller 702 that serves as the communications interface between GCMM card 650 and an on-board accounting server manager (ASM) 704. ASM 704 is responsible for the de-capsulation or removal of the SCCP envelope that contains the accounting message. The de-capsulated accounting message is then passed to an adjacent usage measurements database 706 where usage measurements and statistics are created and stored.

Usage measurements and statistics produced and stored in database 706 may include peg counts of messages received from a specific group code, a specific network address and group code combination, a specific service provider, a specific service user, a specific IP address, or a specific signaling link. Table 4 shown below illustrates exemplary usage measurements that may be created and stored in usage measurements database 706.

within a second network identified by a second group code. With such capability included within a duplicate point code routing node, network operators greatly increased flexibility with regard to group code-specific billing, without significantly increasing network OA&M requirements.

In order to facilitate such billing operations, ASP server 700 also includes a billing application 708 extracts information stored in the usage measurements database 706 and subsequently generates bills. Once again, information or parameters maintained in database 706 that may be used in the generation of bills may include, a group code identifier, a network address identifier or a combination of network address and group code, a service provider identifier, a service user identifier, socket identifier, a signaling link identifier, and a service type identifier. A network address identifier may include a destination or originating SS7 point code, a destination or origination IP address, a destination or origination domain name, or a combination of address and group code identifier.

Once again, in the particular embodiment shown, copies of incoming signaling messages that require accounting service are encapsulated within an SCCP packet and subsequently internally routed to GCMM 650. SCCP encapsulation is not essential to the operation of the message accounting subsystem of the present invention. Other internal encapsulation protocols could be just as easily employed, provided that a suitably provisioned GCMM module is capable of receiving and processing the encapsulated messages. In fact, no encapsulation necessarily need be performed, as long as the accounting message generated by a discrimination module can be received and processed by a suitable configured GCMM module.

In the case of an encapsulated accounting message, the accounting message is internally routed by distribution module 310 via IMT bus 320 to GCMM 650. The accounting

TABLE 4

Usage Measurements

| Keys | | Data Fields | | | | | | |
|---|---|---|---|---|---|---|---|---|
| Call ID | Time | Service Provider | Service Recipient | Service Type | CdPA | Originating PC/IP Add. | SSN/Port | Group Code |
| 1025 | 23:12.23 | 12 | 34 | 01 | jsmith@aol.com | 2-1-1 | 50 | FR |
| 1534 | 23:34.01 | 23 | 13 | 01 | 9194605500 | 102.20.20.10 | 23 | IT |
| 1632 | 23:36.59 | 12 | 15 | 03 | Retailer.com | 103.30.30.10 | 24 | FR |

As shown in sample Table 4, each call or communication is identified by a call ID, and certain information associated with a "call" or communication can be stored in the database. In Table 4, exemplary information that may be stored in a each entry includes the time of day that a message was received, the duration of a call or communication, general quality of service (QoS) indicators associated with a call or communication, information related to or identifying the type of service that is associated with a call or communication (i.e., broadband service related, call setup related, database query related, etc.). Such usage information may be used in combination with group code information to bill a subscriber at different rates depending upon the type of service requested. For instance, a subscriber in a first network identified by a first group code could be billed at one rate for a call or communication related to the downloading of a movie from a video server, and a different rate for the same call if placed from message is received and processed by SCCP module 652 resident on GCMM card 650. GCMM card 650 verifies and validates the SCCP packet prior to further processing. The SCCP packet is next passed to SCRC 654 which is responsible for discrimination and subsequent distribution of messages based on information contained in the SCCP packet. Messages that satisfy the SCRC discrimination criteria are distributed or directed to the high-speed Ethernet controller (EC) 656. EC 656 communicates the SCCP message via an Ethernet connection to the associated ASP server 700.

As such, the SCCP encapsulated accounting message is received by a corresponding Ethernet controller 702 and subsequently passed to the accounting services manager 704. ASM 704 examines the received accounting message, removes the SCCP encapsulating layer and extracts the information from the accounting message according to a predetermined set of usage measurement rules. This usage measurement information is then provided to the usage measurements database 706 for analysis and storage. Billing information may be generated by the accounting subsystem via the billing application 708. Billing application 708 extracts information from the usage and measurements process 706 and applies a set of predetermined billing rate rules, so as to generate invoices or bills indicating costs associated with various aspects of communication services.

Other accounting services may include usage measurements service, fraud detection service, and network management service. Although not explicitly shown, it will be appreciated that the external accounting server may include a user interface, such use a web-based interface, that provides a user-friendly method of extracting and utilizing the various accounting services data once it is collected.

Thus, as described above a duplicate point code routing node is capable of receiving messages addressed to duplicate point codes and routing the messages to the appropriate network using an internal identifier, which is referred to herein as a group code. In one embodiment, the duplicate point code routing node associates a group code with an incoming signaling message based on signaling link from which the message arrives. In an alternate embodiment, a duplicate point code routing node may receive the group code in a group code field of an IP-encapsulated SS7 message. Because a duplicate point code routing node is capable of routing messages addressed to duplicate point codes, interconnectivity between any networks that are associated with each other using group codes can be achieved with a reduced number of STPs.

It will be appreciated that various details of the invention may be changed without departing from the scope of the invention. Furthermore, the foregoing description is for the purpose of illustration only, and not for the purpose of limitation—the invention being defined by the claims.

What is claimed is:

1. A method for routing signaling messages between signaling networks that use duplicate point codes, the method comprising:
   (a) receiving, at a signaling message routing node, a message addressed to a first point code shared by a first signaling node residing in a first communications network and a second signaling node residing in a second communications network;
   (b) associating a group code with the message, wherein the group code is used to identify either the first communications network or the second communications network;
   (c) determining whether to route the message to the first signaling node or the second signaling node based on the group code and the first point code; and
   (d) routing the message to the signaling node based on the determination in step (c).

2. The method of claim 1 wherein receiving a message includes receiving a signaling system 7 (SS7) signaling message.

3. The method of claim 2 wherein receiving an SS7 signaling message includes receiving an SS7 signaling message that includes an International Telecommunications Union national (ITU-N) point code.

4. The method of claim 1 wherein receiving a message includes receiving a network management message.

5. The method of claim 1 wherein the first communications network serves a first country and the second communications network serves a second country different from the first country.

6. The method of claim 5 wherein associating a group code includes associating a group code indicative of the first country.

7. The method of claim 1 wherein associating a group code includes looking up a linkset associated with the message in a table including mappings of signaling linksets to group codes.

8. The method of claim 1 wherein associating a group code includes looking up a signaling link associated with the message in a table including mappings of signaling links to group codes.

9. The method of claim 1 wherein routing the message includes routing the message to one of a plurality of groups using a single physical port associated with the routing node based on the group code.

10. The method of claim 1 wherein routing the message includes routing the message to a mated duplicate point code routing node across an IP-link supporting multiple groups and encapsulating a group code in the message in order to identify the proper group among the multiple groups with which the message should be associated.

11. The method of claim 1 wherein associating a group code includes encapsulating the group code along with at least a portion of the message within an encapsulating packet.

12. The method of claim 11 wherein encapsulating the group code along with at least a portion of the message within an encapsulating packet includes encapsulating the signaling message within a transport adapter layer interface (TALI) packet.

13. The method of claim 11 wherein encapsulating the group code along with at least a portion of the message within an encapsulating packet includes encapsulating the signaling message within a session initiation protocol (SIP) packet.

14. The method of claim 1 comprising generating an accounting message including the group code in response to receiving the message.

15. The method of claim 14 wherein generating an accounting message includes generating a copy of the message.

16. The method of claim 14 including sending the accounting message to a usage measurements and billing system.

17. The method of claim 14 including creating a billing record based on the group code.

18. A method for isolating network management messages to a proper network or networks based on group codes, the method comprising:
   (a) receiving a network management message;
   (b) associating a group code with the network management message, wherein the group code is used to identify a first communications network or a second communications network; and
   (c) generating a network management message in response to the received network management message and routing the generated network management message to a destination group in either the first communications network or the second communications network as identified by the group code and thereby isolating distribution of the generated network management message to the proper communications network.

19. The method of claim 18 wherein associating a group code with the network management message includes performing a lookup in a linkset table based using a signaling linkset from which the network management was received to determine the group code.

20. The method of claim 19 comprising encapsulating the network management message in a TALI packet and placing the group code in the TALI packet.

21. A routing node for routing signaling messages between signaling networks wherein the same network point code is used in more than one of the signaling networks, the routing node comprising:
(a) a communications module adapted to receive a message addressed to a point code shared by a first network element in a first signaling network and a second network element in a second signaling network;
(b) a discrimination module associated with the communications module for associating a first group code with the message, wherein the first group code is used to identify either the first signaling network or the second signaling network; and
(c) a routing module associated with the communications module for determining whether to route the message to the first signaling network or the second signaling network based on the group code and the point code.

22. The routing node of claim 21 wherein the communications module is a signaling system 7 (SS7) message transfer part (MTP) capable link interface module (LIM).

23. The routing node of claim 21 wherein the communications module is an SS7/Internet protocol (IP) capable data communications module (DCM).

24. The routing node of claim 23 wherein the data communications module is adapted to receive and properly route messages from multiple groups on a single IP interface using group codes.

25. The routing node of claim 23 wherein the data communications module is adapted to support multiple A links on a single IP interface using group codes.

26. The routing node of claim 21 wherein the point code is an international telecommunications union-national (ITU-N) point code.

27. The routing node of claim 21 wherein the first signaling network serves a first country and the second signaling network serves a second country.

28. The routing node of claim 21 wherein the discrimination module resides on the communications module.

29. The routing node of claim 21 wherein the group code is indicative of a country.

30. The routing node of claim 21 wherein the discrimination module obtains the group code from a table that correlates group codes with signaling links or linksets.

31. The routing node of claim 21 including an Internet protocol (IP)-based encapsulation process for encapsulating at least a portion of the signaling message and the group code within a packet.

32. The routing node of claim 31 wherein the packet is a transport adapter layer interface (TALI) packet.

33. The routing node of claim 32 wherein the packet is a session initiation protocol (SIP) packet.

34. The routing node of claim 21 wherein the distribution module is further adapted to generate an accounting message based on the first signaling message which includes the first group code information.

35. The routing node of claim 34 wherein the accounting message is a copy of at least a portion of the signaling message.

36. The routing node of claim 34 including a group code measurements module (GCMM) for receiving the accounting message and creating a billing record based at least in part on the first group.

37. A computer program product comprising computer executable instructions embodied in a tangible computer-readable medium and which when executed by a processor of a computer perform steps comprising:
(a) receiving a signaling message containing a point code shared by signaling points in different national networks; (b) associating a group code with the signaling message, wherein the group code is used to identify the national network to which the signaling message should be routed; and
(c) routing the signaling message to the appropriate national network based on the group code and the point code.

* * * * *